(12) United States Patent
Ichida et al.

(10) Patent No.: US 7,874,567 B2
(45) Date of Patent: Jan. 25, 2011

(54) BICYCLE SHIFTING CONTROL APPARATUS (75) Inventors: Tadashi Ichida, Nara (JP); Takumi Onogi, Osaka (JP); Kazuhiro Fujii, Osaka (JP); Masahiko Fukuda, Hyogo (JP); Haruyuki Takebayashi, Osaka (JP); Ryuichiro Takamoto, Osaka (JP)

(73) Assignee: Shimano Inc., Osaka (JP)

( * ) Notice: Subject to any disclaimer, the term of this patent is extended or adjusted under 35 U.S.C. 154(b) by 51 days.

(21) Appl. No.: 12/395,754

(22) Filed: Mar. 2, 2009

(65) Prior Publication Data
US 2010/0218633 A1    Sep. 2, 2010

(51) Int. Cl.
*B62M 1/02* (2006.01)

(52) U.S. Cl. ...................................... 280/260

(58) Field of Classification Search ................. 280/238, 280/260; 474/69; 701/1, 51, 55, 56
See application file for complete search history.

(56) References Cited

U.S. PATENT DOCUMENTS

| | | | |
|---|---|---|---|
| 6,367,833 B1 * | 4/2002 | Horiuchi | 280/260 |
| 6,480,761 B2 * | 11/2002 | Ueno et al. | 700/245 |
| 7,144,027 B2 | 12/2006 | Kitamura et al. | |
| 2003/0100392 A1 | 5/2003 | Ichida | |
| 2005/0200606 A1 * | 9/2005 | Willemin et al. | 345/166 |

* cited by examiner

*Primary Examiner*—Tony H. Winner
(74) *Attorney, Agent, or Firm*—Global IP Counselors, LLP (57) ABSTRACT A bicycle shifting control apparatus controls an electrical power supplied from a power supply to first and second gear shifting devices that are operated by first and second gear shift operating devices, respectively. The bicycle shifting control apparatus includes a first power supply sensor and a controller. The first power supply sensor detects a power level of the power supply. The controller receives a power level signal from the first power supply sensor. The controller performs a stopping operation of the first gear shifting device in response to the first power supply sensor detecting the power level of the power supply being below a first prescribed power level, but the controller transmits a second gear shift signal from the second gear shift operating device to the second gear shifting device to perform a second shifting operation of the second gear shifting device.

20 Claims, 4 Drawing Sheets

FIG. 5

BICYCLE SHIFTING CONTROL APPARATUS

BACKGROUND OF THE INVENTION

1. Field of the Invention

This invention generally relates to a bicycle shifting control apparatus. More specifically, the present invention relates to a bicycle shifting control apparatus that controls an electrical power supplied from a power supply to first and second gear shifting devices that are operated by first and second gear shift operating devices, respectively.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. In particular, the bicycle transmission has been significantly changed over the years.

Recently, bicycle transmissions have been equipped with electrical components to make riding easier and more enjoyable for the rider. Some bicycles are equipped with electrically controlled shifting systems. In particular, in theses electrically controlled shifting systems, front and rear gear shift operating devices are typically provided on the bicycle handlebar to operate front and rear gear shifting devices (e.g., motorized derailleurs). The front and rear gear shifting devices (e.g., motorized derailleurs) are provided with electric motors that move their respective chain guides laterally to shift the bicycle chain between the various gears for obtaining a desired gear position. Typically, bicycles equipped with electrically controlled shifting systems are also provided with an electrical power supply such as a battery or a generator. One example of an electrically controlled shifting system is disclosed in U.S. Pat. No. 7,144,027, which is assigned to Shimano, Inc.

In view of the above, it will be apparent to those skilled in the art from this disclosure that there exists a need for an improved bicycle shifting control apparatus. This invention addresses this need in the art as well as other needs, which will become apparent to those skilled in the art from this disclosure.

SUMMARY OF THE INVENTION

One object of the present invention is to provide a bicycle shifting control apparatus that stops the operation of a first gear shifting device when a power supply level falls below a first prescribed power level, but permits operation of a second gear shift operating device.

According to one aspect, a bicycle shifting control apparatus is provided for controlling an electrical power supplied from a power supply to first and second gear shifting devices that are operated by first and second gear shift operating devices, respectively. The bicycle shifting control apparatus comprises a first power supply sensor and a controller. The first power supply sensor detects a power level of the power supply. The controller is operatively coupled to the first power supply sensor to receive a power level signal from the first power supply sensor. The controller stops operation of the first gear shifting device by the first gear shift operating device in response to the first power supply sensor detecting the power level of the power supply being below a first prescribed power level, but the controller transmits a second gear shift signal from the second gear shift operating device to the second gear shifting device to perform a second shifting operation of the second gear shifting device.

These and other objects, features, aspects and advantages of the present invention will become apparent to those skilled in the art from the following detailed description, which, taken in conjunction with the annexed drawings, discloses a preferred embodiment.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
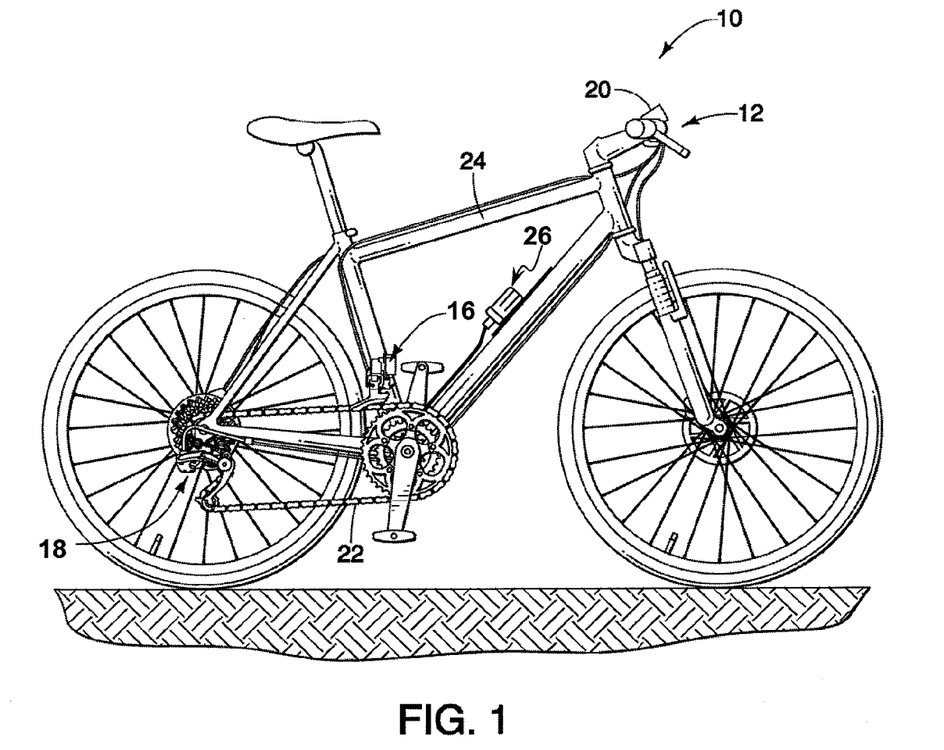
FIG. 1 is a side elevational view of a bicycle that is equipped with a bicycle shifting control apparatus in accordance with one embodiment.
Figure 2:
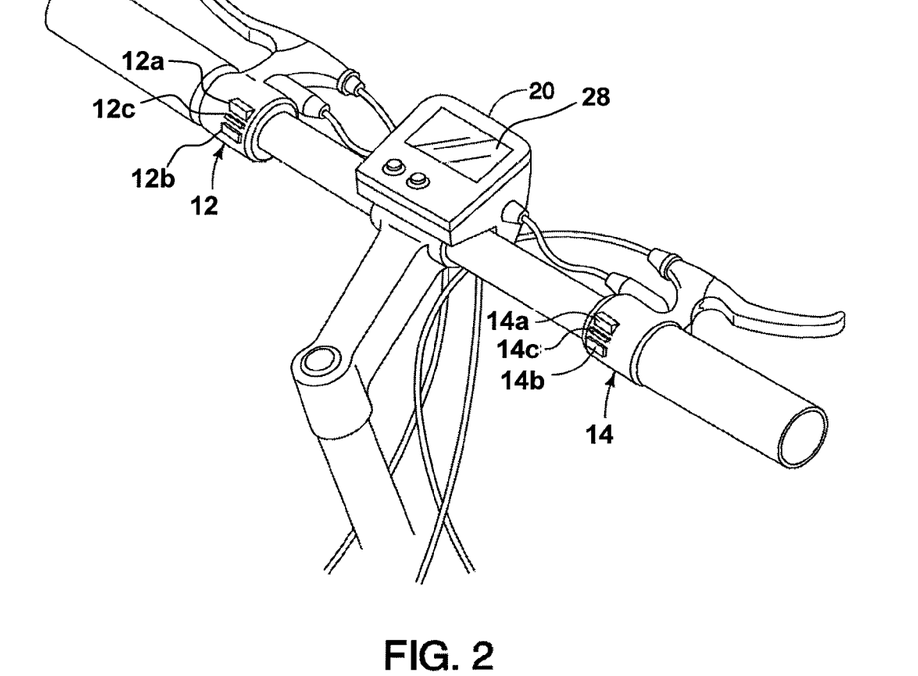
FIG. 2 is a perspective view of the handlebar area of the bicycle illustrated in FIG. 1, with a pair of gear shift operating devices mounted to a straight type handlebar.

Referring initially to FIG. 1, a bicycle 10 is illustrated that is equipped with a bicycle shifting control apparatus in accordance with a first embodiment. As seen in FIGS. 1 and 2, the bicycle shifting control apparatus basically includes a left hand side shifter 12, a right hand side shifter 14, a motorized front derailleur 16 (FD), a motorized rear derailleur 18 (RD) and a main control unit 20. Basically, in order to shift gears, the derailleurs 16 and 18 are operated to move a chain 22 laterally with respect to a bicycle frame 24 in response to operation of the shifters 12 and 14. The bicycle shifting control apparatus is also provided with a power supply or battery 26 for supplying electrical power to the derailleurs 16 and 18 and the main control unit 20. Optionally, the bicycle shifting control apparatus is also provided with a display unit 28 that can be part of the main control unit 20 or a separate member that is electrically connected to the main control unit 20. Other than the bicycle shifting control apparatus, as explained below, the bicycle 10 can be any type of bicycle. Thus, the parts of the bicycle 10 will not be discussed herein, except for those parts that will assist in the understating of the bicycle shifting control apparatus.

Figure 3:
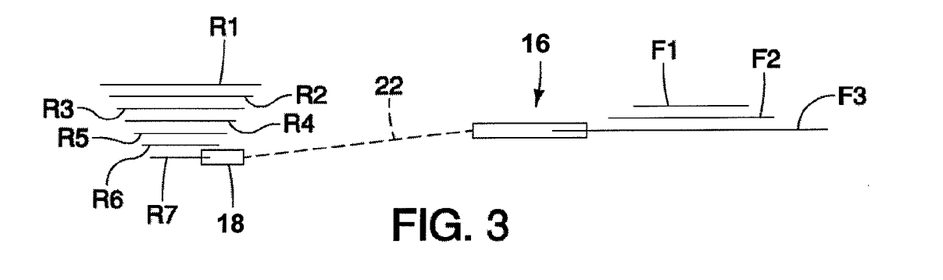
FIG. 3 is a schematic diagram showing one example of a derailleur type of drive train including front and rear derailleurs (i.e., gear shifting devices), front and rear sprockets and a chain that is used in the bicycle illustrated in FIG. 1.

As diagrammatically illustrated in FIG. 3, the drive train of the bicycle 10 includes a set of front sprockets F1 to F3 mounted to the crank axle in a conventional manner, and a set of rear sprockets R1 to R7 mounted to the rear axle of the rear wheel in a conventional manner. The chain 22 operatively coupled between the rear sprockets R1 to R7 and the front sprockets F1 to F3 in a conventional manner. The shifters 12 and 14 are operated by the rider in order to control movement (e.g., perform gear shifting operations) of the front and rear derailleurs 16 and 18 with respect to the front sprockets F1 to F3 and the rear sprockets R1 to R7, respectively. Since the drive train is conventional, the drive train will not be discussed in more detail herein. Moreover, the bicycle shifting control apparatus is not limited to a derailleur type drive train. Rather, it will be apparent from this disclosure that the bicycle shifting control apparatus can be used with other types of drive trains that use electric gear shifting devices.

Figure 4:
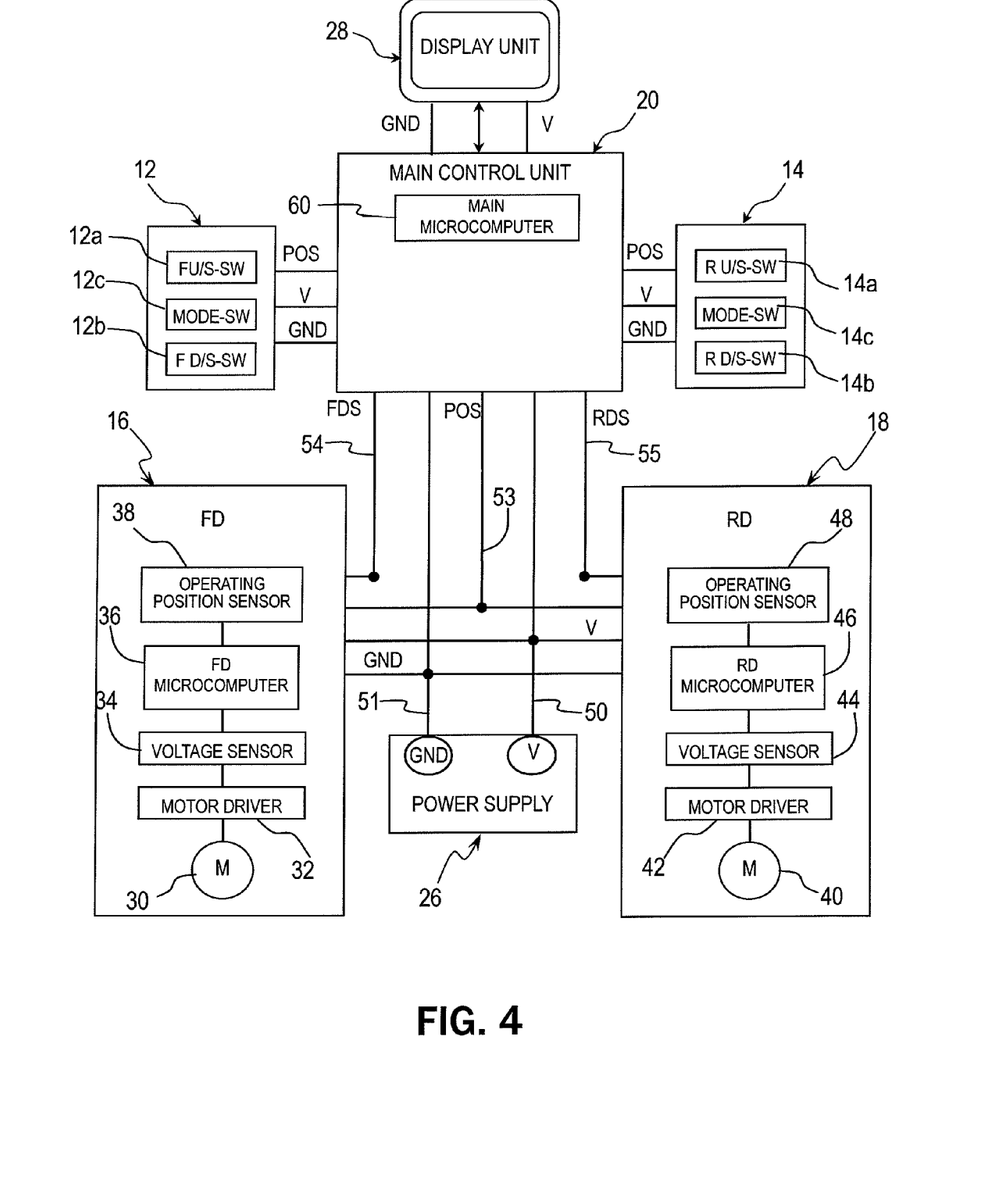
FIG. 4 is a schematic block diagram showing the entire configuration of the bicycle shifting control apparatus.

As seen in FIGS. 2 and 4, the left hand side shifter 12 is a front electronic shifter that is a pushbutton-type switching member. Of course, it will be apparent from this disclosure that other types of electronic shifters can be used as needed and/or desired. The left hand side shifter 12 is preferably provided with a front derailleur upshift switch 12a, a front derailleur downshift switch 12b and a first mode switch 12c. These switches 12a to 12c are push button type switches that are operatively coupled to the main control unit 20. The shifting switches 12a and 12b constitute an input part for inputting gear shift commands and calibration commands, while the switch 12c constitutes an input part for inputting mode commands. The front derailleur upshift 12a is normally used for upshifting the front derailleur 16, while the front derailleur downshift switch 12b is normally used for downshifting the rear derailleur 16. The mode switch 12c is used to change the switches 12a and 12b from a shifting mode to other modes including, but not limited to, a calibration mode for calibrating gear positions of the front derailleur 16.

Still referring to FIG. 2, the right hand side shifter 14 is a rear electronic shifter that is a pushbutton-type switching member. Of course, it will be apparent from this disclosure that other types of electronic shifters can be used as needed and/or desired. The right hand side shifter 14 is preferably provided with a rear derailleur upshift switch 14a, a rear derailleur downshift switch 14b and a second mode switch 14c. These switches 14a to 14c are push button type switches that are operatively coupled to the main control unit 20. The shifting switches 14a and 14b constitute an input part for inputting gear shift commands and calibration commands, while the switch 14c constitutes an input part for inputting mode commands. The rear derailleur upshift switch 14a is normally used for upshifting the rear derailleur 18, while the rear derailleur downshift switch 14b is normally used for downshifting the rear derailleur 18. The mode switch 14c is used to change the switches 14a and 14b from a shifting mode to other modes including, but not limited to, a calibration mode for calibrating gear positions of the rear derailleur 18.

As seen in FIG. 1, the front derailleur 16 is mounted to a seat tube of the frame 24, while the rear derailleur 18 is mounted to a rear portion of a chain stay of the frame 24. The front and rear derailleurs 16 and 18 are configured such that they can be controlled electrically by the shifters 12 and 14, respectively. The front and rear derailleurs 16 and 18 can be conventional electronic derailleurs that have been adapted for the bicycle shifting control apparatus as disclosed herein.

Preferably, the front derailleur 16 includes a motor 30, a motor driver 32, a voltage sensor 34, a FD microcomputer 36 and an operating position sensor 38. The motor 30 is a reversible motor that is configured and arranged to drive the front derailleur 16 (i.e., the move the chain guide of the front derailleur 16 laterally with respect to the frame 24). The motor driver 32 is configured and arranged to drive the motor 30 in response to control signals from the FD microcomputer 36. The motor driver 32 includes motor drivers and deceleration units for driving and decelerating the rotation of the motor 30. The FD microcomputer 36 is configured and arranged to control the motor driver 32 in response to a shift signal from the shifter 12 via the main control unit 20. The FD microcomputer 36 includes control circuits with CPUs, storage units, computation units, and the like. The FD microcomputer 36 also includes software that controls the motor 30 in accordance with shift signals outputted from the shifter 12. The voltage sensor 34 detects the voltage level or power level of the electricity being supplied to the motor 30 from the power supply 26. The position sensor 38 is configured and arranged to control and sense the gearshift position of the front derailleur 16 with respect to the front sprockets F1 to F3. The position sensor 38 is a sensor that uses rotary encoders or the like, for example, to sense the shifted positions of the front derailleur 16.

Similarly, the rear derailleur 18 preferably includes a motor 40, a motor driver 42, a voltage sensor 44, a RD microcomputer 46 and an operating position sensor 48. The motor 40 is a reversible motor that is configured and arranged to drive the rear derailleur 18 (i.e., the move the chain guide of the rear derailleur 18 laterally with respect to the frame 24). The motor driver 42 is configured and arranged to drive the motor 40 in response to control signals from the RD microcomputer 46. The motor driver 42 includes motor drivers and deceleration units for driving and decelerating the rotation of the motor 40. The RD microcomputer 46 is configured and arranged to control the motor driver 42 in response to a shift signal from the shifter 14 via the main control unit 20. The RD microcomputer 46 includes control circuits with CPUs, storage units, computation units, and the like. The RD microcomputer 46 also includes software that controls the motor 40 in accordance with shift signals outputted from the shifter 14. The voltage sensor 44 detects the voltage level or power level of the electricity being supplied to the motor 40 from the power supply 26. Normally, the voltage sensor 44 is not used unless power is cut off to the front derailleur 16. Rather, the detection result by the voltage sensor 34 is normally sent to the RD microcomputer 46. However, if the RD microcomputer 46 does not receive the detection result from the voltage sensor 34, then the RD microcomputer 46 determines that the voltage sensor 44 is broken or the power has been cut off to the front derailleur 16. Thus, if the voltage sensor 44 is broken or the power has been cut off to the front derailleur 16, then the detection result from the voltage sensor 44 is transmitted to the main control unit 20 and the FD microcomputer 36. The position sensor 48 is configured and arranged to control and sense the gearshift position of the rear derailleur 18 with respect to the rear sprockets R1 to R7. The position sensor 48 is a sensor that uses rotary encoders or the like, for example, to sense the shifted positions of the rear derailleur 18.

The shifter 12 constitutes a first or front gear shift operating device, while the shifter 14 constitutes a second or rear gear shift operating device. The motorized front derailleur 16 constitutes a first or front gear shifting device, while the motorized rear derailleur 18 constitutes a second or rear gear shifting device. Of course, the uses of "first" and "second" in referring to the parts of the bicycle shifting control apparatus are merely labels that can be reversed with respect to the various parts including, but not limited to, the shifters 12 and 14 and the derailleurs 16 and 18. In the illustrated embodiment, the motorized front derailleur 16 (i.e., the first or front gear shifting device) requires more electrical power to operate than an amount of electrical power needed to operate the motorized rear derailleur 18 (i.e., the second or rear gear shifting device). The derailleur's 16 and 18 (i.e., tie gear shifting devices) are external transmission devices in the illustrated embodiment. However, the gear shifting devices can be either internal or external transmission devices as needed and/or desired.

The parts of the derailleurs 16 and 18, the shifters 12 and 14, the main control unit 20 and the display unit 28 are supplied with electrical power from the power supply 26 mounted on the frame 24, as shown in FIG. 1. Specifically, the power supply 26 has a power supply line 50 and a grounding wire 51 that are electrically coupled to the derailleurs 16 and 18, the shifters 12 and 14, the main control unit 20 and the display unit 28. A power supply voltage V of about 6 to 8.4 volts (DC) is preferably supplied to these components.

Furthermore, the gearshift position signals POS of the front and rear position sensors 38 and 48 are output to the main control unit 20 via a position signal line 53. In the main control unit 20, the gearshift position signals POS are converted into display signals, and the gearshift positions of the front and rear derailleurs 16 and 18 are displayed by the display unit 28. Voltage data (VD: e.g., three stages of voltage data) is also output to the position signal line 53. Furthermore, the gearshift signals U/S (upshift) and D/S (downshift) are output from the main control unit 20 in accordance with the operation of the switching members 12a, 12b, 14a and 14b of the shifters 12 and 14 to the front and rear derailleurs 16 and 18 by the respective gearshift signal lines 54 and 55. In actual practice, the gearshift signal line 55 of the gearshift signal RDS is connected to the rear derailleur 18 via the front derailleur 16. Accordingly, the front derailleur 16 is connected to the main control unit 20 via five-core wiring, e.g., via the down tube, and the rear derailleur 18 is connected to the front derailleur 16 via four-core wiring, e.g., via the chain stay. Accordingly, a connector that connects all of the five-core wiring can be disposed in the front derailleur 16.

The main control unit 20 is operatively disposed between the shifters 12 and 14 (e.g., the first and second gear shift operating devices) and the front and rear derailleurs 16 and 18 (e.g., the first and second gear shifting devices) with the main control unit 20 receiving the front (first) and rear (second) gear shift signals from the shifters 12 and 14 (e.g., the first and second gear shift operating devices), respectively, and transmitting the front (first) and rear (second) gear shift signals to the first and second microcomputers 36 and 46 of the front and rear derailleurs 16 and 18, respectively.

The main control unit 20 includes a microcomputer 60 that cooperates with the microcomputers 36 and 46 of the front and rear derailleurs 16 and 18 to control the shifting of the front and rear derailleurs 16 and 18. The microcomputer 60 of includes other a central processing unit (CPU) and other conventional components such as an input interface circuit, an output interface circuit, and storage devices such as a ROM (Read Only Memory) device and a RAM (Random Access Memory) device. The microcomputer 60 with a manual shift control program and an auto-shift control program. The manual shift control program provides for manually shifting the front and rear derailleurs 16 and 18 via the shifters 12 and 14 when a manual shifting mode is selected. The auto-shift control program provides for automatically controlling the shifting the front and rear derailleurs 16 and 18 when an automatic shifting mode is selected. It will be apparent to those skilled in the art from this disclosure that the precise structure and algorithms for the main control unit 20 can be any combination of hardware and software that will carry out the functions of the present invention.

The microcomputer 60 of the main control unit 20 and the microcomputers 36 and 46 of the front and rear derailleurs 16 and 18 together constitute a bicycle shifting controller of the bicycle shifting control apparatus. In other words, the bicycle shifting controller includes the FD microcomputer 36 as a first microcomputer that is associated with the front derailleur 16 (e.g., the first gear shifting device) and the RD microcomputer 46 as a second microcomputer associated with the rear derailleur 18 (e.g., the second gear shifting device). The bicycle shifting controller of the bicycle shifting control apparatus is operatively coupled to the voltage sensors 34 and 44 (e.g., the power supply sensors) to receive a power level signal from the voltage sensors 34 and 44, in which the power level signal is indicative of a current power (voltage) lever of the power supply 26. The detection results of the voltage sensors 34 and 44 are sent to each of the microcomputer 60 of the main control unit 20 and the microcomputers 36 and 46 of the front and rear derailleurs 16 and 18. However, normally, only the detection results of one of the voltage sensors 34 and 44 is used or sent at a time as discussed above.

While three separate microcomputers are used to form the bicycle shifting controller of the bicycle shifting control apparatus in this illustrated embodiment, fewer or more microcomputers can be utilized as needed and or desired. In other words, the microcomputers 36 and 46 of the front and rear derailleurs 16 and 18 can be eliminated and their functions and operations can be combined into the microcomputer of the main control unit 20 as needed and/or desired.

The bicycle shifting controller is programmed to control the supply of power to the front and rear derailleurs 16 and 18 so that the front derailleur 16 is stopped and the rear derailleur 18 is maintained movable when power of the power supply 26 (i.e., the storage element) dropped to an undesirable level (i.e., below a first prescribed power level), and both the front and rear derailleurs 16 and 18 are stopped when power of the power supply 26 (i.e., the storage element) dropped to below a second prescribed power level. When the power of the power supply 26 drops below the second prescribed power level, the bicycle shifting controller is programmed to move the rear derailleur 18 to a predetermined gear (e.g., second gear, third gear, etc.) as needed and or desired.

Energy to move the front derailleur 16 is larger than energy to move the rear derailleur 18. Therefore when the power of the power supply 26 drops, at first below the first prescribed power level, the front derailleur 16 is stopped. In other words, the bicycle shifting controller judges power (storage) level of the power supply 20, if the voltage sensor 34 and/or 44 detects the power level (e.g., the voltage) is lower than the first prescribed power level, then the bicycle shifting controller stops the front gear shifting, with keeping the rear gear shifting is movable. Thus, when power of the power supply 26 drops below the first prescribed power level, and the rider commands front gear shifting using one of the front shifting switches 12a and 12b, the front derailleur 16 will not move. However, the rear derailleur 16 is able to move accordance with rear shifting signal from the rear shifting switches 14a and 14b. As a result, the power of the power supply 26 is saved, so that the rider can shift gears using the rear derailleur 18 for more long time. Further, if the front derailleur 16 is stopped, the rider can know that the power of the power supply 26 is dropping. Hereby the rider can reduce times of shift gear for saving energy.

As mentioned above, the bicycle shifting controller stops operation of the front derailleur 16 (e.g., the first gear shifting device) by the front shifter 12 (e.g., the first gear shift operating device) in response to the voltage sensor 34 (e.g., the first power supply sensor) detecting the power level of the power supply being below a first prescribed power level, but the bicycle shifting controller transmits a rear (second) gear shift signal from the rear shifter 14 (e.g., the second gear shift operating device) to the rear derailleur 18 (e.g., the second gear shifting device) to perform a rear (second) shifting operation of the rear derailleur 18 (e.g., the second gear shifting device). There are several ways that the bicycle shifting controller can stop the supply of power from the power supply 26 to the front derailleur 16.

A first control method performed by the bicycle shifting controller is conducted by the FD microcomputer 36 of the front derailleur 16. In particular, when the FD microcomputer 36 of the front derailleur 16 receives a front shifting signal from the main control unit 20, and the FD microcomputer 36 does not operate the motor driver 32 and the motor 30 even though a front shifting signal has been received by the FD microcomputer 36. A second control method performed by the bicycle shifting controller is conducted by the microcomputer 60 in the main control unit 20. In particular, when the microcomputer 60 in the main control unit 20 receives a front shifting signal from one of the front shifting switches 12a and 12b, the microcomputer 60 in the main control unit 20 does not output the front shifting signal to the FD microcomputer 36 of the front derailleur 16, even though a front shifting signal has been received by the microcomputer 60 in the main control unit 20. A third control method performed by the bicycle shifting controller is conducted by the microcomputer 60 in the main control unit 20 in which the microcomputer 60 in the main control unit 20 stops receiving front shifting signals from the front shifting switches 12a and 12b, even though the front shifting switches 12a and 12b are operated. A fourth control method performed by the bicycle shifting controller is conducted by the microcomputer 60 in the main control unit 20 ill which the microcomputer 60 in the main control unit 20 stops the supply of power to the front shifter 12. A fifth control method performed by the bicycle shifting controller is conducted by the microcomputer 60 in the main control unit 20 in which the microcomputer 60 in the main control unit 20 stops the supply of power to the front derailleur 16.

While two voltage sensors 34 and 44 are used in the illustrated embodiment of the bicycle shifting control apparatus as the power level sensors, it will be apparent to those skilled in the art from this disclosure that the location of a power level sensor is not limited to the front and rear derailleurs 16 and 18. Rather, the power level sensor can be located in other locations such as at the power supply 26. Also as mentioned above, normally, the voltage sensor 44 is not used unless power is cut off to the front derailleur 16. Rather, the detection result by the voltage sensor 34 is normally sent to the RD microcomputer 46. However, if the RD microcomputer 46 does not receive the detection result from the voltage sensor 34, then the RD microcomputer 46 determines that the voltage sensor 44 is broken or the power has been cut off to the front derailleur 16. Thus, if the voltage sensor 44 is broken or the power has been cut off to the front derailleur 16, then the detection result from the voltage sensor 44 is transmitted to the main control unit 20 and the FD microcomputer 36. If the RD microcomputer 46 and the main control unit 20 start receiving the detection result signal from the voltage sensor 34 again, the microcomputers 36 and 46 and the main control unit 20 will operate according with the detection result of the voltage sensor 34.

As mentioned above, if the power of the power supply 26 drops further below the second prescribed power level threshold, not only the front derailleur 16 but also the rear derailleur 18 is stopped. In other words, the bicycle shifting controller stops operation of the rear derailleur 18 (e.g., the second gear shifting device) by the rear shifter 14 (e.g., the second gear shift operating device) in response the power level of the power supply 26 being below the second prescribed power level that is lower than the first prescribed power level. Thus, the bicycle shifting controller sets the second prescribed power level to a value that stops operation of both of the front and rear derailleurs 16 and 18 (e.g., the first and second gear shifting devices) prior to complete discharge of the power supply 26 (e.g., the electrical energy storage device) when the power level of the power supply 26 is below the second prescribed power level. In this way, over discharge of the power supply 26 is restrained. The RD microcomputer 46 receives the detection result from the voltage sensor 34 (if working) or the voltage sensor 44, and then the bicycle shifting controller judges the power (storage) level of the power supply 26. If detected the power level is lower than the second prescribed power level threshold, then the bicycle shifting controller stops the rear gear shifting. With respect to stopping rear shifting, it is similar stopping the front shifting, and thus, the five control method performed by the bicycle shifting controller for stopping the front shifting can also be used for stopping rear shifting. In other words, the stopping rear shifting can be accomplished by: (1) the RD microcomputer 46 not operating the motor driver 42 and the motor 40 even though a rear shifting signal has been received by the RD microcomputer 46; (2) the microcomputer 60 in the main control unit 20 not outputting the rear shifting signal to the RD microcomputer 46 of the rear derailleur 18, even though a rear shifting signal has been received by the microcomputer 60 in the main control unit 20; (3) the microcomputer 60 in the main control unit 20 stopping the transmission of the rear shifting signals from the rear shifting switches 14a and 14b, even though the rear shifting switches 14a and 14b are operated; (4) the microcomputer 60 in the main control unit 20 stopping the supply of power to the rear shifter 14; and (5) the microcomputer 60 in the main control unit 20 stopping the supply of power to the rear derailleur 18.

Preferably, the display unit 28 indicates the current voltage or power level to the rider. The display unit 28 includes at least one LED to the current voltage or power level to the rider. As the voltage level of the power supply 26 decreases, the emitting pattern of the LED or emitting color of the LED is changed by the microcomputer 60 in the main control unit 20. For example, the following table illustrates one example of the power level indication to the rider.

TABLE 1

| Power (Voltage) Level | FD & RD Status | LED Emitting Status |
| --- | --- | --- |
| 4 | FD & RD Both Movable | Constant Green Light |
| 3 | FD & RD Both Movable | Flashing Green Light |
| 2 | FD & RD Both Movable | Constant Red Light |
| 1 | Only RD Movable | Constant Red Light |
| 0 | FD & RD Both Stopped | Flashing Red Light |

Figure 5:
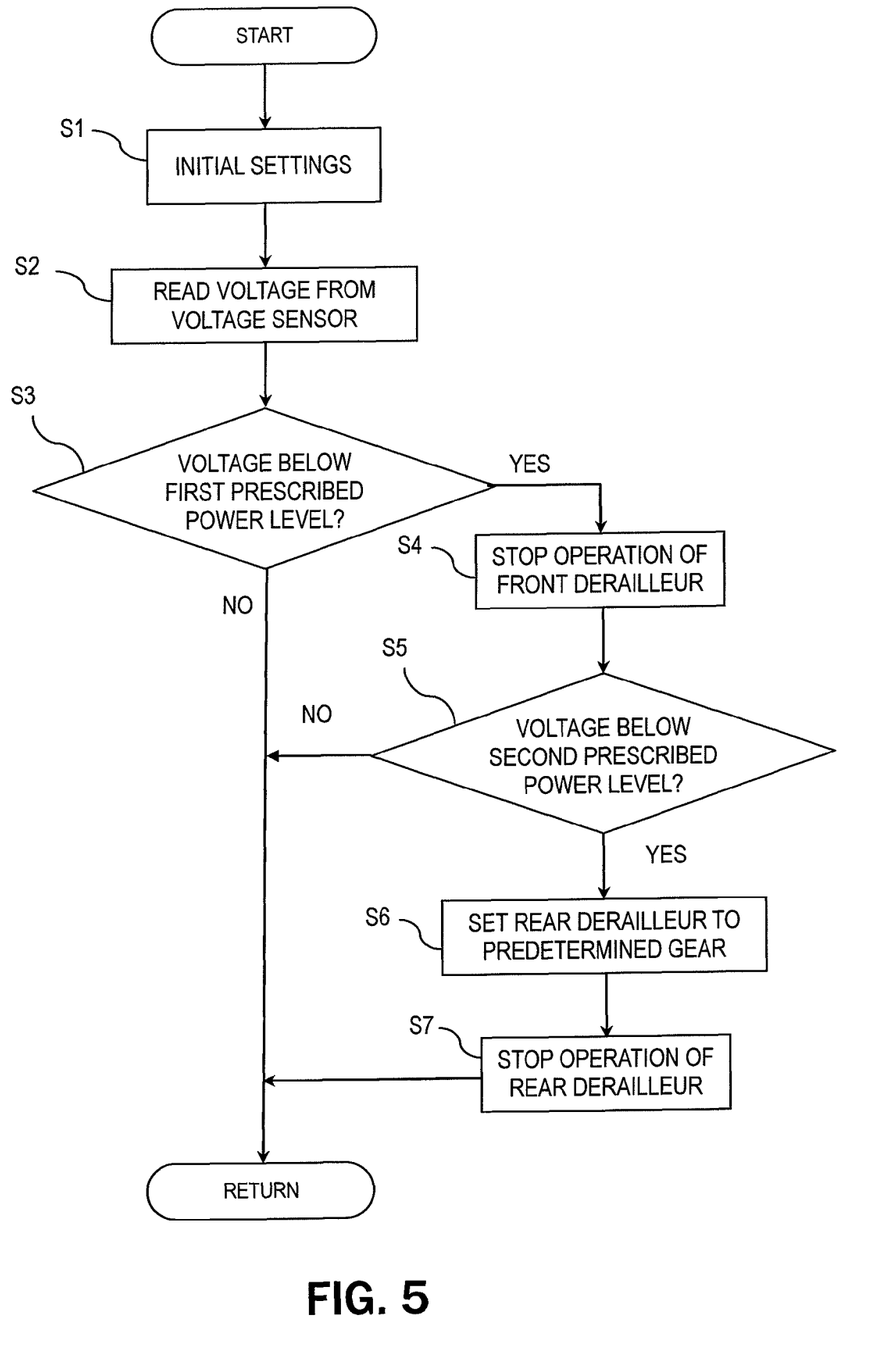
FIG. 5 is a flowchart showing the control processing executed by the controller of the bicycle shifting control apparatus.

Turning now to the flow chart of FIG. 5, the bicycle shifting controller (i.e., the main control unit 20, the FD microcomputer 36 and the RD microcomputer 46) conducts the process on a continuous basis every at prescribed time intervals once the main control unit is turned "on" which results in power being supplied to the shifters 12 and 14 and the front and rear derailleurs 16 and 18.

In step S1, the all of the previous detected values and/or flags are cleared from memory. Then the process proceeds to step S2.

In step S2, the power (voltage) level of the power supply 26 is read from the voltage sensor 34 and/or 44. The power (voltage) level is then transmitted to the microcomputer 60 in the main control unit 20, the FD microcomputer 36 and the RD microcomputer 46. Then the process proceeds to step S3.

In step S3, the bicycle shifting controller determines if the power (voltage) level of the power supply 26 is below the first prescribed power level. If the power (voltage) level is below the first prescribed power level, then the process proceeds to step S4 where the front derailleur 16 is stopped. However, in step S3, if the bicycle shifting controller determines the power (voltage) level of the power supply 26 is not below the first prescribed power level, then the process returns to the beginning to start again at the next prescribed time interval.

As mentioned above, there are at least five different methods for continuing operation of the front derailleur 16 or for stopping the front derailleur 16 in step S3. A first control method is performed by the operations of the shifting switches 12a and 12b (e.g., the first gear shift operating device) transmitting a first or front gear shift signal to the FD microcomputer 36 (i.e., NO in step S3), but the FD microcomputer 36 does not operate the front derailleur 16 (e.g., the first gear shifting device) when the power level of the power supply 26 is below the first prescribed power level (i.e., YES in step S3). A second control method is performed by the main control unit 20 transmitting a first or front gear shift signal to the FD microcomputer 36 in response to operation of the shifting switches 12a and 12b (e.g., the first gear shift operating device) when the power level of the power supply 26 is above the first prescribed power level (i.e., NO in step S3), and stopping transmission of the first or front gear shift signal to the FD microcomputer 36 when the power level of the power supply 26 is below the first prescribed power level (i.e., YES in step S3). A third control method is performed by main control unit 20 receiving a transmission of a first or front gear shift signal from the shifting switches 12a and 12b (e.g., the first gear shift operating device) in response to operation of the shifting switches 12a and 12b (e.g., the first gear shift operating device) when the power level of the power supply 26 is above the first prescribed power level (i.e., NO in step S3), and the main control unit 20 disrupts transmission of the first or front gear shift signal to the main control unit 20 when the power level of the power supply 26 is below the first prescribed power level (i.e., YES in step S3). A fourth control method is performed by the main control unit 20 supplying power to the shifting switches 12a and 12b (e.g., the first gear shift operating device) when the power level of the power supply 26 is above the first prescribed power level (i.e., NO in step S3), and stopping the supply of power to the shifting switches 12a and 12b (e.g., the first gear shift operating device) when the power level of the power supply 26 is below the first prescribed power level (i.e., YES in step S3). A fifth control method is performed by the main control unit 20 supplying power to the front derailleur 16 (e.g., first gear shifting device) when the power level of the power supply 26 is above the first prescribed power level (i.e., NO in step S3), and stopping the supply of power to the front derailleur 16 (e.g., first gear shifting device) when the power level of the power supply 26 is below the first prescribed power level (i.e., YES in step S3).

In step S5, the bicycle shifting controller determines if the power (voltage) level of the power supply 26 is below the second prescribed power level. If the power (voltage) level is below the second prescribed power level, then the process proceeds to step S6. However, in step S5, if the bicycle shifting controller determines the power (voltage) level of the power supply 26 is not below the second prescribed power level, then the process returns to the beginning to start again at the next prescribed time interval.

In step S6, the rear derailleur 18 is set by the bicycle shifting controller to a predetermined gear (e.g., second gear, third gear, etc.) as needed and or desired stopped. Then the process proceeds to step S7 where the rear derailleur 18 is stopped and then the process returns to the beginning to start again at the next prescribed time interval.

In step S7, stopping rear shifting is similar to stopping the front shifting, as discussed above. In other words, the stopping rear shifting can be accomplished by: (1) the RD microcomputer 46 not operating the motor driver 42 and the motor 40 even though a rear shifting signal has been received by the RD microcomputer 46; (2) the microcomputer 60 in the main control unit 20 not outputting the rear shifting signal to the RD microcomputer 46 of the rear derailleur 18, even though a rear shifting signal has been received by the microcomputer 60 in the main control unit 20; (3) the microcomputer 60 in the main control unit 20 stopping the transmission of the rear shifting signals from the rear shifting switches 14a and 14b, even though the rear shifting switches 14a and 14b are operated; (4) the microcomputer 60 in the main control unit 20 stopping the supply of power to the rear shifter 14; and (5) the microcomputer 60 in the main control unit 20 stopping the supply of power to the rear derailleur 18.

After step S7, the process returns to the beginning to start again at the next prescribed time interval.

Basically, a bicycle shifting method is conducted by: detecting the power level of the power supply 26 that supplies electrical energy to operate an electric first gear shifting device (e.g., one of the derailleurs 16 and 18) in response to operation of a first gear shift operating device (e.g., one of the shifters 12 and 14), and that supplies electrical energy to operate an electric second gear shifting device (e.g., the other of the derailleurs 16 and 18) in response to operation of a second gear shift operating device (e.g., the other of the shifters 12 and 14); and stopping the electrical energy from being supplied to the first gear shifting device in response to operation of the first gear shift operating device upon detecting the power level of the power supply 26 is below the first prescribed power level, while still transmitting a second gear shift signal from the second gear shift operating device to the second gear shifting device to perform a second shifting operation in the second gear shifting device.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle shifting control apparatus for controlling an electrical power supplied from a power supply to first and second gear shifting devices that are operated by first and second gear shift operating devices, respectively, the bicycle shifting control apparatus comprising:
    a first power supply sensor that detects a power level of the power supply; and
    a controller operatively coupled to the first power supply sensor to receive a power level signal from the first power supply sensor,
    the controller stopping an operation of the first gear shifting device by the first gear shift operating device in response to the first power supply sensor detecting the power level of the power supply being below a first prescribed power level, the controller transmitting a second gear shift signal from the second gear shift operating device to the second gear shifting device to perform a second shifting operation of the second gear shifting device.

2. The bicycle shifting control apparatus according to claim 1, wherein
    the controller stops the operation of the second gear shifting device by the second gear shift operating device in response the power level of the power supply being below a second prescribed power level that is lower than the first prescribed power level.

3. The bicycle shifting control apparatus according to claim 2, wherein
    the controller sets the second prescribed power level to a value that stops the operations of both of the first and second gear shifting devices prior to complete discharge of the power supply when the power level of the power supply is below the second prescribed power level.

4. The bicycle shifting control apparatus according to claim 1, further comprising
    a second power supply sensor detecting the power being supplied by the power supply.

5. The bicycle shifting control apparatus according to claim 1, wherein
    the controller includes a first microcomputer associated with the first gear shifting device and a second microcomputer associated with the second gear shifting device, with an operation of the first gear shift operating device transmitting a first gear shift signal to the first microcomputer, the first microcomputer being prevented from operating the first gear shifting device when the power level of the power supply is below the first prescribed power level, and with an operation of the second gear shift operating device transmitting the second gear shift signal to the second microcomputer.

6. The bicycle shifting control apparatus according to claim 5, wherein
    the controller further includes a control unit operatively disposed between the first and second gear shift operating devices and the first and second gear shifting devices with the control unit receiving the first and second gear shift signals from the first and second gear shift operating devices, respectively, and transmitting the first and second gear shift signals to the first and second microcomputers, respectively.

7. The bicycle shifting control apparatus according to claim 5, wherein
    the controller stops the operation of the second gear shifting device by the second gear shift operating device in response to the power level of the power supply being below a second prescribed power level that is lower than the first prescribed power level by the second microcomputer not operating the second gear shifting device.

8. The bicycle shifting control apparatus according to claim 1, wherein
    the controller includes a control unit, a first microcomputer associated with the first gear shifting device and a second microcomputer associated with the second gear shifting device, with the control unit transmitting a first gear shift signal to the first microcomputer in response to an operation of the first gear shift operating device when the power level of the power supply is above the first prescribed power level and stopping transmission of the first gear shift signal to the first microcomputer when the power level of the power supply is below the first prescribed power level.

9. The bicycle shifting control apparatus according to claim 8, wherein
    the controller stops the operation of the second gear shifting device by the second gear shift operating device in response to the power level of the power supply being below a second prescribed power level that is lower than the first prescribed power level by stopping transmission of the second gear shift signal from the control unit to the second microcomputer.

10. The bicycle shifting control apparatus according to claim 1, wherein
    the controller receives transmission of a first gear shift signal from the first gear shift operating device in response to an operation of the first gear shift operating device when the power level of the power supply is above the first prescribed power level, and
    the controller disrupts transmission of the first gear shift signal to the controller when the power level of the power supply is below the first prescribed power level.

11. The bicycle shifting control apparatus according to claim 10, wherein
    the controller stops the operation of the second gear shifting device by the second gear shift operating device in response to the power level of the power supply being below a second prescribed power level that is lower than the first prescribed power level by stopping transmission of the second gear shift signal from the second gear shift operating device to the controller.

12. The bicycle shifting control apparatus according to claim 1, wherein
    the controller stops supplying power to the first gear shift operating device when the power level of the power supply is below the first prescribed power level.

13. The bicycle shifting control apparatus according to claim 12, wherein
    the controller stops the operation of the second gear shifting device by the second gear shift operating device in response to the power level of the power supply being below a second prescribed power level that is lower than the first prescribed power level by stopping power to the second gear shift operating device.

14. The bicycle shifting control apparatus according to claim 1, wherein the controller stops supplying power to the first gear shifting device when the power level of the power supply is below the first prescribed power level.

15. The bicycle shifting control apparatus according to claim 14, wherein the controller stops the operation of the second gear shifting device by the second gear shift operating device in response to the power level of the power supply being below a second prescribed power level that is lower than the first prescribed power level by stopping power to the second gear shifting device.

16. The bicycle shifting control apparatus according to claim 1, wherein the first gear shifting device requires more electrical power to operate than an amount of electrical power needed to operate the second gear shifting device.

17. The bicycle shifting control apparatus according to claim 1, wherein the first gear shifting device is a front gear shifting device, and the second gear shifting device is a rear gear shifting device.

18. The bicycle shifting control apparatus according to claim 1, wherein the controller sets the second gear shifting device to a predetermined gear in response the power level of the power supply being below a second prescribed power level that is lower than the first prescribed power level.

19. A bicycle shifting method comprising:

detecting a power level of a power supply that supplies electrical energy to operate an electric first gear shifting device in response to an operation of a first gear shift operating device, and that supplies electrical energy to operate an electric second gear shifting device in response to an operation of a second gear shift operating device; and stopping the electrical energy from being supplied to the first gear shifting device in response to the operation of the first gear shift operating device upon detecting the power level of the power supply is below a first prescribed power level, while still transmitting a second gear shift signal from the second gear shift operating device to the second gear shifting device to perform a second shifting operation in the second gear shifting device.

20. The bicycle shifting method according to claim 19, further comprising setting the second gear shifting device to a predetermined gear in response the power level of the power supply being below a second prescribed power level that is lower than the first prescribed power level.

* * * * *